US010105714B2

(12) United States Patent
Faure et al.

(10) Patent No.: US 10,105,714 B2
(45) Date of Patent: Oct. 23, 2018

(54) METHOD FOR THE RADIOACTIVE DECONTAMINATION OF SOIL BY DISPERSED AIR FLOTATION FOAM AND SAID FOAM

(71) Applicant: COMMISSARIAT A L'ENERGIE ATOMIQUE ET AUX ENERGIES ALTERNATIVES, Paris (FR)

(72) Inventors: Sylvain Faure, Venasque (FR); Marc Messalier, Saint Michel d'Euzet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 915 days.

(21) Appl. No.: 14/399,155

(22) PCT Filed: May 10, 2013

(86) PCT No.: PCT/EP2013/059708
§ 371 (c)(1),
(2) Date: Nov. 5, 2014

(87) PCT Pub. No.: WO2013/167728
PCT Pub. Date: Nov. 14, 2013

(65) Prior Publication Data
US 2015/0110560 A1    Apr. 23, 2015

(30) Foreign Application Priority Data

May 11, 2012  (FR) ..................................... 12 54352
Jul. 13, 2012  (JP) ................................. 2012-158124

(51) Int. Cl.
*B03D 1/02*    (2006.01)
*B03D 1/24*    (2006.01)
(Continued)

(52) U.S. Cl.
CPC ................ *B03D 1/245* (2013.01); *B09C 1/02* (2013.01); *G21F 9/001* (2013.01); *G21F 9/125* (2013.01); *G21F 9/30* (2013.01); *B03D 2201/02* (2013.01)

(58) Field of Classification Search
None
See application file for complete search history.

(56) References Cited

U.S. PATENT DOCUMENTS 2,570,120 A * 10/1951 Sawyer .................. B03D 1/002
                                                      209/166
2,838,369 A *  6/1958 Gaudin .................. B03D 1/008
                                                      209/166
(Continued)

FOREIGN PATENT DOCUMENTS

EP    0 041 728 A1   12/1981
FR      2827530 A1    1/2003
(Continued)

OTHER PUBLICATIONS

International Search Report for International Application No. PCT/EP2013/059708 dated Jun. 5, 2013.
(Continued)

*Primary Examiner* — Thomas M Lithgow
(74) *Attorney, Agent, or Firm* — Miles & Stockbridge P.C.

(57) ABSTRACT

The present invention relates to a process for treating an earth contaminated by at least one radionuclide such as cesium $^{137}$Cs comprising at least one step of separating said radionuclide by dispersed air flotation foam produced by blowing air bubbles in a suspension comprising said earth and at least one collector. The present invention also relates to the flotation foam obtained by implementing such a process.

22 Claims, 3 Drawing Sheets

(51) Int. Cl.
*B09C 1/02* (2006.01)
*G21F 9/00* (2006.01)
*G21F 9/30* (2006.01)
*G21F 9/12* (2006.01)

(56) References Cited

U.S. PATENT DOCUMENTS

| | | | |
|---|---|---|---|
| 3,975,265 A * | 8/1976 | Petrovich | B03D 1/06 |
| | | | 209/166 |
| 3,976,565 A * | 8/1976 | Petrovich | B03D 1/011 |
| | | | 209/166 |
| 5,303,871 A | 4/1994 | Bateson et al. | |
| 6,455,751 B1 | 9/2002 | Hoffman et al. | |
| 7,026,274 B2 | 4/2006 | Jenevein | |
| 7,083,806 B2 | 8/2006 | Rippon et al. | |
| 7,713,357 B2 | 5/2010 | Faure et al. | |
| 7,718,010 B2 | 5/2010 | Faure et al. | |
| 2003/0109017 A1 | 6/2003 | Conerly et al. | |
| 2004/0022867 A1 | 2/2004 | Tucker et al. | |
| 2006/0073067 A1 | 4/2006 | Schilling et al. | |
| 2008/0228022 A1 | 9/2008 | Faure et al. | |
| 2010/0069281 A1 | 3/2010 | Guignot et al. | |
| 2011/0186444 A1 | 8/2011 | Cuer et al. | |
| 2012/0021068 A1 | 1/2012 | Barness et al. | |
| 2013/0171024 A1 | 7/2013 | Cuer et al. | |

FOREIGN PATENT DOCUMENTS

| | | |
|---|---|---|
| FR | 2891470 A1 | 4/2007 |
| JP | 2002-248459 | 9/2002 |
| JP | 2002-248459 A | 9/2002 |
| WO | 0185845 A1 | 11/2001 |
| WO | 03008529 A1 | 1/2003 |
| WO | 2007039598 A2 | 4/2007 |
| WO | 2010037809 A1 | 4/2010 |

OTHER PUBLICATIONS

Rogers, J. et al., "Decontamination assessment of Bacillus anthracis, Bacillus subtilis, and Geobacillus stearothermophilus spores on indoor surfaces using a hydrogen peroxide gas generator", J. Appl. Microbiol., pp. 1-10, vol. 99, No. 4 (2005).

Josse, D. et al., "Decontamination Cutanee Vis-a-Vis des Agents Organophosphores et de l'yperite au Soufre: Bilan et perspectives", Medecine & Armees, pp. 33-36 (English Abstract), vol. 34, No. 1 (Feb. 2006).

Harper, B. et al. "A Comparision of Decontmination Technologies for Biological Agents on Selected Commercial Surface Material", Domestic Preparedness, Publisher: U.S. Army Soldier and Biological Chemical Command (Apr. 2001).

Controle "Management of sites and soil polluted by radioactivity", The French Nuclear Safety Authority Review No. 195,166 pages (Nov. 2012).

Poinssot, et al. "Experimental and modelling studies of caesium sorption on illite", Geochimica Cosmochimica Acta, 63 19/20, pp. 3217-3227 (1999).

Rigol, et al. "An overview of the effect of organic matter on soil radiocaesium interaction: implications in root uptake", J. Environ Radioactivity, 58, pp. 191-216 (2002).

French Search Report for French Application No. 1254352 (dated Jan. 31, 2013).

* cited by examiner

METHOD FOR THE RADIOACTIVE DECONTAMINATION OF SOIL BY DISPERSED AIR FLOTATION FOAM AND SAID FOAM

TECHNICAL FIELD

The invention pertains to the field of depollution, disinfection, purification, remediation and/or decontamination of soils.

Indeed, the present invention provides a novel process of decontamination, in particular of radioactive decontamination of soils and, in particular, of radioactive decontamination of earths strongly contaminated by cesium 137Cs, said process implementing flotation foams or floating foams used in a dispersed air column.

The present invention also relates to said flotation foam.

STATE OF PRIOR ART

According to the Public Health Code, is considered as a radioactive substance "any substance which contains one or more radionuclides the activity or concentration of which cannot be neglected from the radiation protection point of view". Radionuclides most likely to be found in a context of a soil polluted by radioactive substances are more precisely the following radionuclides [1]:

- tritium $^3$H;
- carbon $^{14}$C;
- strontium $^{90}$Sr with its descendant ($^{90}$Y);
- cesium $^{137}$Cs with its descendant ($^{137m}$Ba);
- americium $^{241}$Am;
- radionuclides of the thorium $^{232}$ family: $^{232}$Th, $^{228}$Ra, $^{228}$Ac, $^{228}$Th, $^{224}$Ra, $^{220}$Rn, $^{216}$Po, $^{212}$Pb, $^{212}$Bi, $^{208}$Tl and $^{212}$Po; and
- radionuclides of the uranium 238 family and in particular radium Ra, Rn, $^{218}$Po, $^{214}$Pb, $^{214}$Bi, $^{214}$Po, $^{210}$Pb, $^{210}$Bi and $^{210}$Po.

The soil is a complex system from the physical and chemical points of view, being a mixture of mineral and organic matters. Besides stones and gravels having sizes higher than 2 mm, the mineral fraction, mainly silicates or carbonates, represents a fraction lower than 2 mm, from products of physical and then chemical degradation of the parent rock and that can be classified in decreasing diameters: sands, silts and so-called granulometric or colloidal clay consisting of fine negatively charged particles having typically a diameter lower than 100 µm. As for the organic fraction, it comes from animal, plant, fungal and microbial living organic matter, which encompasses the entire active biomass, debris of plant origin (plant residues, exudates), of animal origin (dejections, dead bodies), of fungal and microbial origin (dead bodies, exudates) called "fresh organic matter"; the intermediate organic compounds, called "transient organic matter" from the evolution of the fresh organic matter; and stabilized organic compounds, humic matters or humus, from the evolution of the preceding matters.

The contamination of soils by radioactive substances can most often result from industrial, medical or research activities involving these substances.

But the contamination can unfortunately result from known incidents or accidents such as, for example, accidental spill or fire, that have led to the uncontrolled release of huge amounts of pollutants into the environment. Such has been the case of the Chernobyl accident and more recently, the Fukushima one.

In France, provisions relating to the protection of populations against the danger of ionizing radiations are set by the Public Health Code. The latter sets to 1 mSv/year the maximum limit of expositions humans can receive due to nuclear activities. As soon as a radiocontaminated soil can generate a high received dose for a surrounding population, it is necessary to apply a soil decontamination or remediation technique or process to bring the radioactivity back to an acceptable threshold for the population.

Whether in industrial situation or in accidental situation, prior to decontamination of a radiocontaminated soil, the radiological contamination forms and sources originated in this contamination must be investigated for and characterised. This work has to rely on history data (practiced activities . . . ), completed by data from measurements performed in the field. Radionuclides present in the soil should be identified, quantified and located.

Besides these works there is added the need for soil remediation techniques or processes, which would be effective and deployable in the field.

Indeed, following an episode or several successive episodes of atmospherical radioactive discharges, part of air dispersed radionuclides is deposited on the earth surfaces, causing a surface contamination of plants, earth and built environment, as well as a contamination of surface water. The radioactive deposits thus formed are more or less persistent in the environment. They can be characterised either by the measurement of surface activity (in Bq/m$^2$) of the radionuclides making up these deposits, or the measurement of the mass activity in the earth (in Bq/kg, enabling the contamination risk of plants to be assessed by radionuclide transfer by roots), or finally by the measurement of the ambient dose flow rate (in µSv/h) due to gamma radiations emitted by these deposits.

The soil decontamination techniques used until now can be classified in three categories: off-site, on-site and in-situ. Most of these techniques generally require the excavation of the earth to be treated.

Historically, the first employed method consists of the off-site replacement decontamination method. In this method, the contaminated soil is stripped throughout the polluted thickness. The removed earth is replaced by healthy earth collected elsewhere. Besides the transport costs induced by this method, costs related to the refining or storage of contaminated earth are proportional to the displaced volume, which directly depends on the area and depth of the polluted zone. It is worthy of note that the contaminated earth is considered as industrial waste as soon as it is displaced.

The injection in the ground of a liquid or a pressurized gas likely to dissolve the pollutant(s) can be used, when the latter are known. This method corresponds to the physico-chemical depollution. The contaminated earths can then be gradually refined there. This assumes a refining temporary industrial facility for:

- the extraction of the earth to be treated, this step can however be optional;
- the percolation or gas injection process;
- the recovery of lixiviates and their refining;
- the repositioning of the treated earth, when it has been excavated.

The decontamination method by extraction by suction is suitable for sandy grounds and cheap, for volatile and semi-volatile pollutants such as, for example, hydrocarbons. In this method, the ground is depressurized by a vacuum pump, the vapours are treated by catalytic oxidation, refrigerating condensation or active carbon adsorption. The treatment facility is movable to cover the site.

During the application of the so-called "venting" method or extraction by injection, pressurized air, nitrogen or vapour is injected. This treatment is suitable for air permeable grounds, for volatile solvents, such as for example chlorinated solvents. Wells enable vapours, refined as upon suction, to be recovered and injected. The soil can further be heated (through micro-waves) to improve the technique effectiveness.

The electrical extraction method is mostly suitable for ionized pollutants such as heavy metals and some organic ions. The nature of the ground is not much important provided that its conductivity is good, in particular thanks to the presence of water. Porous electrodes are implanted so as to generate an electrical current in the soil which leads the migrate ions to migrate towards opposite charge electrodes. The recovery of pollutants can for example be made through pumping.

There are different alternatives for soil washing decontamination methods: the washing can be made at high pressure, normal pressure, on-site or off-site. The objective is to separate the finest particles wherein pollutants are mostly concentrated (high pressure water washing), or to catch these pollutants in a liquid solution such as water or an acid. In the first case, the earth has to be excavated, recovered wastes are stored as wafers, whereas, in the second case, the treatment can be performed without extraction if the ground is permeable. For example, most heavy metals such as copper, zinc, arsenic, cadmium and lead can be extracted using an acid solution which must then be neutralized in order to precipitate part of the compounds, and then allowed to settle, filtered and centrifugated, in order to separate remaining elements. High pressure in-situ washing however remains restricted to small size zones in its application, since the water pressure rapidly decreases as the distance from the injection nozzle increases. There are also techniques using other solvents such as alkanes, alcohols or ketones in order to dissolve most of organic and toxic pollutants. They are cheap and based on injection the solvent, followed by extraction by one of the above described techniques.

Since the 1990's, depollution processes have been implemented involving biological treatments based on the capacity of some living organisms to filter and accumulate toxic elements in their body or to use them as food. Such processes seem to solve part of cost problems raised by conventional modes. However, other problems are to be solved, in particular as regards the proliferation risk of used organisms, even though conditions to be met on site are very accurate for them to grow normally. Finally, whereas laboratory tests are generally conclusive, the implementation in the field can turn out to be disappointing, for example if pollutant concentrations are locally too high, or if the very nature of the ground includes unexpected elements compromising the growth of these organisms.

Some bacteria are capable of degrading complex molecules and thus to draw therefrom energy they need to live. They have been used for years to treat soils polluted by chlorinated solvents. But it has been observed that this microbiological treatment technique by in-situ biological degradation of some pollutants, possibly promoted by the mastering of parameters such as oxygenation, hygrometry degree and temperature, can generate degradation products or metabolites which are more toxic and/or more movable than initial products. These metabolites are not the same whether the microbial activity conditions are aerobic or anaerobic. In order to control the production of the most hazardous metabolites, one can switch from one biodegradation mode to another as required. Currently, researches focus on selecting species suitable for the degradation of each type of pollutants. These researches are conducted jointly by research laboratories and by environmental industries. They are beginning to bear fruit for some types of polycyclic aromatic hydrocarbons having more than three benzene ring, with the use of some strains of fungi having the feature of attacking pollutants by extracellular enzymes.

Furthermore, numerous plants are capable of binding heavy metals, radionuclides, pollutant organic compounds and other undesirable products into their cells. Indeed, some plants produce enzymes which degrade these pollutants into less or non toxic products. They can also be accompanied by a mycorrhizosphere in charge of the binding and/or transformation work, the study of which aiming at industrial scale applications is rapidly growing. These properties make them promising candidates for depolluting soils. Plants are also selected according to (i) their size and ability to dip their roots deeply in the soil, so as to reach deep polluted layers in particular in the order of a few meters, and according to (ii) the type of pollutant they are able to trap. In practice, the earth can also be excavated and spread onto an impervious membrane in a greenhouse, so as to isolate the pollutant matter and precisely control parameters influencing the growth of selected plants. However, this removes one of the major benefits from phytoremediation, that is its low operating cost. One advantage of phytoremediation is the possible valorisation of recyclable pollutants, also called phytomining. Thus, the so-called hyperaccumulator plants, which store the pollutant in their stems and leaves can be harvested and then incinerated in view of recovering metals among ashes and reusing them in metallurgy.

In the case of an accidental radioactive contamination of earths such as that that occurred in Chernobyl or Fukushima, there are few bibliographic works that detail the speciation and position of a recent contamination, i.e. a contamination that occurred 1 year before of the surface of an earth more or less rich in clays and humic complexes, more or less saline and more or less acidic or basic. Typically, for rice fields cultivated around Fukushima, it can be assumed however, without going into details, that cesium 137 is, one year after the accident, within the first 5 centimeters as 2 forms:

a "physisorbed" form at the surface of particles and surface exchangeable by ions [2]; and a bound form, i.e. "trapped" in a quasi irreversibly way inside interfoliar spaces of wet clay particles (strong ionic interactions), complexed in humic substances or inside clay-humic hybrid complexes [3].

The fraction consisting of the finest particles the size of which is between 4 and 50 µm contains the major part of the Cs contamination (>96%). Indeed, water washing tests of 100 g of contaminated earths from Fukushima have been performed at the end of 2011 in Japan. After filtering or sedimentation of the grossest particles the average diameter of which is higher than 100 µm, a cloudy colloidal suspension of fine particles has been obtained and after drying, 4 g earths have been obtained containing more than 96% of the initial Cs contamination. The particles that trap cesium are negatively charged and consequently are hydrophilic.

This shows the need for developing a process enabling contaminated earths to be directly extracted, fine particles containing most of the contamination in a minimized volume or mass (2-15% of the initial weight). The amount of earths to be treated in Fukushima on 300 km$^2$ would be around 30·10⁶ m³. It is necessary to develop a process capable of treating at least 100 tonnes/h of wet earths. The discontinuous front microfiltration seems to be rejected because the filtration cake would quickly restrict the treatment flow rates. Mere settling basins where the earth would be allowed to settle would neither permit the easy recovering of settling fines, by suction and use of high amounts of water.

DESCRIPTION OF THE INVENTION

The inventors' work allowed the development of a process for treating/decontaminating contaminated earths and in particular contaminated by cesium.

Indeed, the inventors have shown that it is possible to treat earths contaminated by radionuclides by using flotation foams or floating foams implemented in a dispersed air column.

Air flotation is a separation process enabling ions (ionic flotation) or solid particles (particulate flotation) to be extracted. It is used in particular in the industrial scale for treating ores and paper deinking with treatment flow rates of several hundreds m³ per hour (20 m³/min). Some works are mentioned for the treatment of soils contaminated by heavy metals or oils. Thus, the patent application JP 2002 248459 [4] proposes a classical flotation of ions (heavy metals) contained in sols through precipitation thanks to scavengers. The latter are in particular sulphur-based or phosphate-based compounds which can have hazardousness. Similarly, the U.S. Pat. No. 5,303,871 [5] discloses a flotation of naturally hydrophobic contaminants (oil or grease comprising pentachlorophenol) which can naturally be floated and a foaming agent might be added to stabilize the foam.

The inventors have now shown that air flotation can be used to remove radionuclide contaminants present in soils, in a foam trapped in particles inside the space between the sheets of wet clay particles, complexed contaminants in humic substances or inside hybrid clay-humic complexes i.e. radionuclide contaminants trapped in hydrophilic particles, while, at the same time, those skilled in the art would have been discouraged from using a flotation technique with non-floatable hydrophilic structures.

The earth flotation by foams is an innovative process of radioactive decontamination of earths and in particular of cesium decontamination earths. The key advantage of the flotation technique is that it directly integrates a soil washing system: the earth is suspended in water at a variable concentration. To this suspension, collecting surfactants and optionally foaming agents are added in small amounts. Air bubbles injected in the mixture "carry" the particles containing colloids contaminated by size affinity and hydrophoby. The association hydrophilic particles containing or trapping radionuclide contaminants+collecting agent (collector) forms hydrophobic solid particles which can float without any radionuclide contaminant release. The process is operated in flotation columns and particulate contaminants are recovered in a froth concentrate that can be easily treated after that by overflow or suction.

The flotation foams of the invention enable high amounts of wet earths to be treated at industrial treatment flow rates of several hundred tonnes per hour. Two scenarios are possible:
  earths are excavated and treated in a dedicated flotation unit;
  a movable flotation unit capable of pumping and directly treating in situ lagoons or rice fields muds in order to limit heavy excavation operations,
  non-floated earths being recycled.

Interestingly, the treatment process according to the invention is generally applicable to any radionuclide and in particular to any trapped radionuclide, in the soil, in interfoliar spaces of wet clay particles (strong ionic interactions), complexed in the humic substances and/or inside hybride clay-humic complexes.

Thus, the present invention relates to a process for treating an earth contaminated by at least one radionuclide comprising at least one step of separating said radionuclide by dispersed air flotation foam. More particularly, the present invention relates to treat an earth contaminated by at least one radionuclide comprising at least one step of separating said radionuclide by dispersed air flotation foam produced by blowing air bubbles into a suspension comprising said earth and at least one collector.

By "process for treating a contaminated earth", it is meant, within the scope of the present invention, both decreasing the amount of radionuclides in the soil and the complete removal of said radionuclides in said soil. Decreasing the amount of radionuclides present in the soil consists in producing an earth the load of at least one radionuclide of which after implementing the process according to the invention is lower than the initial load of said radionuclide of the earth, i.e. before implementing the process according to the invention. By "lower load", it is meant a load at least lower than 50%, in particular at least lower than 70%, in particular at least lower than 90% and, more particularly, at least lower than 95%.

The load of radionuclides can be expressed by the measurement of the surface activity (in Bq/m² of contaminated or treated earth), by the measurement of the mass activity in the earth (in Bq/kg of contaminated or treated earth), or finally by the measurement of ambient dose flow rate (in µSv/h) due to gamma radiations emitted by the contaminated or treated earth. Advantageously, the load of radionuclides is characterised by the measurement of the mass activity in the earth expressed in Bq/kg of contaminated or treated earth.

By "by dispersed air flotation foam", it is meant a process consisting in insufflating, within a liquid mass obtained from the earth contaminated by at least one radionuclide, air bubbles having a diameter that can range from a few micrometers to a few millimeters.

By "contaminated earth", it is meant an earth comprising at least one radionuclide which is not naturally occurring or which is present in an amount higher than the usual amount in said earth. This contamination can result from industrial, medical or research activities using said radionuclide or from incidents or accidents, such as accidental spill or fire with radioactive fallout, releasing said radionuclide. The contaminated earth to be treated in accordance with the process according to the invention can be a cultivated land, an arable land, an earth obtained on an industrial site, or an earth obtained on an urban site.

As already explained, the radionuclide to be removed in the contaminated earth can be any trapped radionuclide, in the soil, in interfoliar spaces of wet clay particles, complexed in humic substances and/or inside hybrid clay-humic complexes.

Advantageously, said radionuclide is selected from the group consisting of tritium $^3$H; carbon $^{14}$C; strontium $^{90}$Sr; yttrium $^{90}$Y; le cesium $^{137}$Cs; barium $^{137m}$Ba; americium $^{241}$Am; a radionuclide from the thorium $^{232}$ family and a radionuclide from the uranium 238 family.

In particular, said radionuclide is selected in the group consisting of $^3$H, $^{14}$C, $^{90}$Sr, $^{90}$Y, $^{137}$Cs, $^{137m}$Ba, $^{241}$Am, $^{232}$Th, $^{228}$Ra, $^{228}$Ac, $^{228}$Th, $^{224}$Ra, $^{220}$Rn, $^{216}$Po, $^{212}$Pb, $^{212}$Bi, $^{208}$Tl, $^{212}$Po, $^{226}$Ra, $^{222}$Rn, $^{218}$Po, $^{214}$Pb, $^{214}$Bi, $^{214}$Po, $^{210}$Pb, $^{210}$Bi and $^{210}$Po.

More particularly, the radionuclide to be removed in the contaminated earth in accordance with the process of the invention is cesium $^{137}$Cs.

The treatment and decontamination process according to the present invention can be either a batch process with a discontinuous supply of earths to be treated, or a continuous process.

Advantageously, the process according to the invention comprises the steps consisting in:
a) injecting air bubbles into a suspension comprising said earth and at least one collector, whereby a foam is produced;
b) separating at least one part of said foam from the rest of the suspension.

The process according to the invention can be implemented in any system known to those skilled in the art and usually used by a flotation process such as a flotation column or a flotation cell. By definition, a flotation cell is a reactor provided with ventilated stirrers, whereas a flotation column has air injectors. Advantageously, the process according to the invention is implemented on a flotation column (or cell) having a height between 1 m and 8 m.

The suspension implemented in step (a) thus comprises the earth to be treated, at least one collector and water. Advantageously, this suspension comprises:
2-40% by weight and in particular 10-30% by weight of earth to be treated based on the total weight of the suspension;
0.005-5% by weight and in particular 0.01-2% by weight of at least one collector based on the total weight of the suspension; and
water.

This suspension is also known as « slurry » in the field of flotation.

By "collector", it is meant, within the scope of the invention, a surfactant having at least one hydrocarbon chain and a polar head which, as a matter of fact, is located at the air-water interface of the air bubbles injected in the slurry. A collector is able to cause the adhesion between floatable solid particles of the suspension and air bubbles. More particularly, the collector is able to make the solid particles more hydrophobic, providing them more affinity to the gas phase than the aqueous phase, said particles thus becoming floatable. A collector can also be able to agglomerate floatable solid particles between them.

By "floatable solid particles", it is meant solid particles from the earth to be treated, having a mineral, organic or organomineral nature, the diameter of which, in particular measured with a FPIA apparatus such as Sysmex FPIA-3000, is lower than 150 µm, in particular lower than 100 µm, and, more particularly, lower than 50 µm, said particles being rendered floatable thanks to the collector. Such particles trap the radionuclide(s) to be removed. Thus, air bubbles formed in the process according to the invention are surrounded by such floatable solid particles.

Within the scope of the present invention, the collector implemented can possibly have a foaming activity. Alternatively, it does not have any foaming activity.

Within the scope of the present invention, the collector implemented is advantageously selected from a fatty acid, a fatty acid salt and a cationic surfactant.

A fatty acid is a alkylcarboxylic acid, also known as "soap" or "fatty acid soap" having the formula $R_1COOH$ with $R_1$ representing a straight, cyclic or branched alkyl chain comprising from 3 to 50 carbon atoms and in particular 5 to 30 carbon atoms. A fatty acid salt is an alkylcarboxylate, also known as "soap salt" or "fatty acid soap salt", having the formula $R_2COOX$ with $R_2$ representing a straight, cyclic or branched alkyl chain comprising from 3 to 50 carbon atoms and in particular 5 to 30 carbon atoms and X representing a metal and in particular a metal selected from the group consisting of calcium, sodium and potassium. Advantageously, the suspension implemented in step (a) of the process according to the present invention is a fatty acid salt and in particular sodium oleate.

By "cationic surfactant", it is meant a surfactant having at least one hydrocarbon chain and a polar head, the hydrophilic part of said surfactant being positively charged. A cationic surfactant is advantageously selected from quaternary ammoniums having at least one $C_4$-$C_{22}$ aliphatic chain associated with an anionic counter-ion in particular selected from boron derivatives such as tetrafluoroborate or halide ions such as F, Br$^-$, I$^-$ or Cl$^-$. As usable cationic surfactant, tetrabutylammonium chloride, tetradecylammonium chloride, tetradecyltrimethylammonium bromide (TTAB), alkylpyridinium halides carrying an aliphatic chain and alkylammonium halides can be mentioned. More particularly, a usable cationic surfactant within the scope of the present invention is TTAB.

The suspension as implemented within the scope of the process according to the invention can comprise a single collector or a mixture of at least two different collectors, belonging to a single type of collector. In other words, said at least two collectors are selected either from fatty acids and salts thereof, or from cationic surfactants. Alternatively, said at least two collectors belong to two different types of collectors. When the suspension implemented within the scope of the process according to the invention comprises a mixture of at least two different collectors, the total amount of collectors by weight is from 0.005 to 5% by weight and in particular from 0.01 to 2% based on the total weight of the suspension.

Within the scope of the invention, the water used to prepare a suspension comprising from 2 to 40% by weight and in particular from 10 to 30% by weight of earth to be treated can be any type of water. Advantageously, this water is selected from the group consisting of osmosis water, distilled water, sea water, spring water, river water, lagoon water, rice field water, industrial water, water from drinking water system or a mixture thereof. More particularly, this water is industrial water or water from a drinking water system. It should be noted that, in the suspension implemented in step (a) of the process according to the invention, this water is mixed with water that the earth to be treated can contain.

The suspension as implemented within the scope of the present invention can comprise besides the collector at least one other element and in particular at least one other surfactant. Advantageously, the present invention considers the addition, to the collector present in the suspension implemented in step (a), such as defined previously, of at least one foaming surfactant. In a particular embodiment of the invention, at least one foaming surfactant is added to at least one fatty acid or fatty acid salt type collector.

The foaming surfactant implemented within the scope of the present invention can be a non-ionic (or neutral) or amphoteric foaming surfactant.

By "non-ionic (or neutral) surfactant", it is meant a compound the surface active properties of which, in particular hydrophily, are provided by uncharged functional groups such as alcohol, ether, ester or even amide, containing heteroatoms such as nitrogen or oxygen. Due to the low hydrophilic contribution of these functions, non-ionic surface active compounds are most often polyfonctionnal. The foaming non-ionic surfactant is in particular selected in the family of alkylpolyglucosides (APG) or alkylpolyetherglucosides (APEG) or in the family of ethoxylated alcohols. The alkylpoly(ether)glucosides are derived from natural glucose, and, preferably biodegradable. By way of example of such surfactants, there can be mentioned the surfactant Oramix CG-110 (trademark) marketed by SEPPIC Company and Glucopon 215 (trademark) marketed by GOGNIS Company.

By "amphoteric surfactant", it is meant compound behaving both as an acid or a base depending on the medium it is placed in. A foaming amphoteric surfactant is in particular selected from the family of sulfobetaines or alkylamidopropylhydroxysulfobetaines such as Amonyl 675 SB (trademark) marketed by SEPPIC or in the family of amineoxides, such as Aromox MCD-W (trademark), cocodimethylamine oxide marketed by Akzo Nobel.

Advantageously, the suspension implemented within the scope of step (a) of the process according to the invention can comprise, besides the collector as previously defined, at least one foaming surfactant selected from polyalkylglucosides, sulfobetaines, ethoxylated alcohols and amine oxides.

When the suspension comprises at least one foaming surfactant besides the collector, it can contain a single foaming surfactant or several different foaming surfactants, such as previously defined. In the suspension implemented in step (a) of the process according to the invention, the foaming surfactant(s) is (are) present in a total amount of 0.005 to 1% by weight and in particular from 0.01 to 0.5% by weight based on the total weight of the suspension.

The suspension implemented in step (a) of the process according to the invention can be prepared in different ways, in particular depending on the nature of the earth to be treated, on the collector(s) used and on the foaming surfactant(s) optionally used.

In a $1^{st}$ embodiment, the earth contaminated by at least one radionuclide is excavated. Once it is excavated, it is introduced in the flotation column (or cell) and is contacted with the water already present, simultaneously introduced or introduced thereafter, so as to obtain a suspension comprising from 2 to 40% by weight and in particular from 10 to 30% by weight of earth to be treated based on the total weight of said suspension.

In a $2^{nd}$ embodiment, the contaminated earth is pumped. This embodiment is particularly suitable in the case where the earth to be treated is rich in water and in particular in the case of an earth to be treated from a rice field or a natural lagoon wherein the earth to be treated has been gathered. The earth to be treated is directly pumped in particular at a concentration of 20 to 50% of earth base on the weight of the pumped matter, before being introduced into the flotation column (or cell) and contacted with the water already present, simultaneously introduced or introduced thereafter, so as to obtain a suspension comprising from 2 to 40% by weight and in particular from 10 to 30% by weight of earth to be treated based on the total weight of said suspension.

Whether the earth to be treated is excavated or pumped, it is the surface layer of the soil which is recovered. Advantageously, this surface layer represents the $1^{st}$ 15 centimeters, in particular the $1^{st}$ 10 centimeters and in particular, the $1^{st}$ 5 centimeters of the soil from the surface.

Further, whether the contaminated earth to be treated is excavated or pumped and for a continuous treatment process according to the invention, the introduction flow rate of the suspension of earth to be treated is between 1 and 2000 m$^3$/h according to the flotation column (or cell) dimensioning.

Finally, whether the contaminated earth to be treated is excavated or pumped, it can be subjected to a prior treatment step so as to remove mineral and/or organic compounds therefrom, such as stones, gravels and particles, having a diameter higher than 300 μm. Such a pre-treatment can be a hydrocycloning or sieving.

When the suspension implemented in step (a) of the process according to the invention only comprises one collector as previously defined, the same can be introduced into the suspension once the earth to be treated is mixed with water, or be placed into water prior to its mixing with the earth to be treated. In the case where the collector is introduced into the suspension once the earth to be treated is mixed with water, this introduction can be made prior to or simultaneously to injecting air bubbles.

When the suspension implemented in step (a) of the process according to the invention comprises at least two collectors or at least one collector and at least one foaming surfactant, these different components can be introduced into the suspension, simultaneously, by groups or one after the other. As previously considered, each of these components can be introduced into the suspension once the earth to be treated is mixed with water, or be placed into water prior to its mixing with the earth to be treated. In the case this component is introduced into the suspension once the earth to be treated is mixed with water, this introduction can be made prior to or simultaneously to injecting air bubbles. It is also possible to consider the introduction of a $1^{st}$ component into the suspension, and then the injection in the latter of air bubbles, the stop of this injection so as to introduce a 2nd component and then the injection of air bubbles again.

Within the scope of the present invention, the average diameter of injected or insufflated air bubbles in step (a) is advantageously between 100 μm and 6 mm, in particular between 200 μm and 4 mm and more particularly, between 1 and 2 mm.

Typically, the ascensional velocity of air bubbles injected in step (a) is between 5 and 80 cm·s$^{-1}$, in particular between 10 and 50 cm·s$^{-1}$ and more particularly in the order of 20 cm·s$^{-1}$ i.e. 20 cm·s$^{-1 \pm 5}$ cm·s$^{-1}$.

In step (a) of the process according to the invention, air bubbles are produced by introducing mechanically dispersed air by a turbine positioned at the bottom of the flotation column (or cell) or by venturi effect injection nozzles.

When the flotation column (or cell) has a height between 1 m and 8 m, the height of the foam produced in step (a) is between 30 cm and 600 cm, in particular between 80 cm and 400 cm.

In step (b) of the process according to the invention, the foam enriched in particles and thus enriched in radionuclides at the top of the column (or the cell) is separated from the rest of the suspension by suction or overflow. Thus, the top of the flotation column is advantageously equipped with a foam recovery system by suction or overflow.

Indeed, the contaminated earth particles are recovered through flotation at the top of the column in a froth concentrate containing less than 5% water, in particular less than 4% water and more particularly less than 2% water. The concentrate thus recovered can be washed with water or not to remove traces of collector(s) and optionally foaming surfactant(s) and be dried in the open air with the aim of a radioactive waste type conditioning, or directly conditioned in cement. Following the implementation of the process according to the invention, a mass concentration factor of at least 10, enabling decontamination factors of 10 to 200 to be reached can be obtained.

The rest of the suspension free from radionuclide(s) can be recovered, optionally washed with water to remove traces of collector(s) and optionally foaming surfactant(s) and optionally dried, prior to being recycled and in particular to being replaced into natural conditions. To that end, the bottom of the flotation column (or cell) is equipped with a discontinuous or a continuous sedimentation drain in order to remove the coarsest non-floated earths (particles) to be recycled, the diameter of which is advantageously higher than 50 μm and in particular between 50 and 300 μm.

The present invention also relates to the foam obtained by implementing the process according to the present invention, from earth suspension comprising:
- 2-40% by weight and in particular 10-30% by weight of earth to be treated based on the total weight of the suspension;
- 0.005-5% by weight and in particular 0.01-2% by weight of at least one collector based on the total weight of the suspension; and
- water.

Everything that has been previously set out as regards elements contained in the implemented suspension and in particular the possible presence of at least one foam surfactant, besides the collector and as regards characteristics and properties of the foam is also applicable to the flotation foam according to the invention.

Additional characteristics and advantages of the present invention will further appear to those skilled in the art upon reading examples given below by way of illustrative and non-limiting purposes, in reference to the appended figures.

BRIEF DESCRIPTION OF THE DRAWINGS

FIG. 2 presents the particle size distribution for sample A (FIGS. 2A and 2B), sample B (FIGS. 2C and 2D) and sample C (FIGS. 2E and 2F) with number distribution weighting (FIGS. 2A, 2C and 2E) and surface distribution weighting (FIGS. 2B, 2D and 2F).

FIG. 3 presents the effect of adding oleate on the particle size distribution in sample A (FIGS. 3C and 3D) with respect to sample A without oleate (FIGS. 3A and 3B), with number distribution weighting (Figures A and 3C) and surface distribution weighting (FIGS. 3B and 3D).

DETAILED DESCRIPTION OF PARTICULAR EMBODIMENTS

I. Process According to the Invention in Batch Cell.

The object is to check, on the laboratory scale, on 440 g earths to be floated, the floatability of earth samples, with different characteristics, with the aim of the radioactive decontamination of contaminated soils.

I.1. Earth Samples.

The samples come from 3 different earths from Camargue (rice field earth, hereafter designated by Sample A), Marcoule (rosemary earth, hereinafter designated by Sample B) and Grenoble (vegetable earth, hereinafter designated by Sample C). Samples A and B are taken at the surface layer whereas sample C is taken on a thickness of several centimeters.

The samples implemented are suspended in water, after a pre-sieving, on a sieve with a 2 mm mesh opening, when necessary. It is not necessary to perform a prior manual grinding.

A Lhomargy disperser used at a rotation speed of 3000 rpm for 5 min enables a 150 g/l earth suspension to be prepared.

Figure 1:
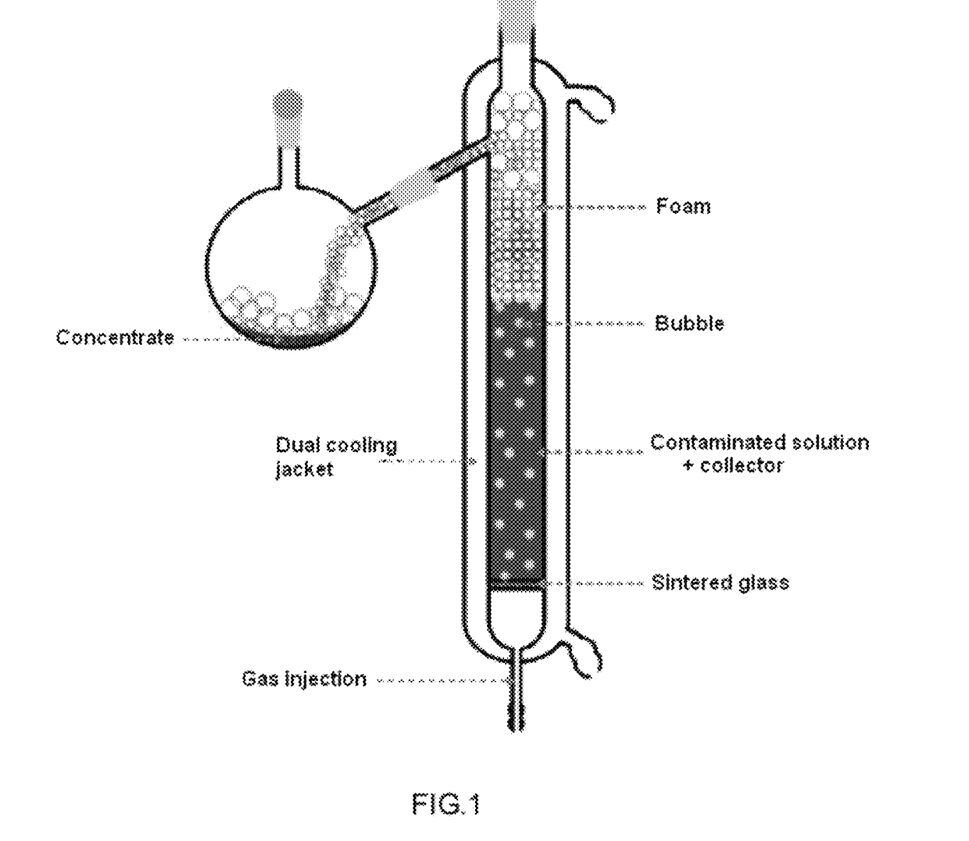
FIG. 1 is a schematization of the column flotation principle on the laboratory scale.
Figure 2A:
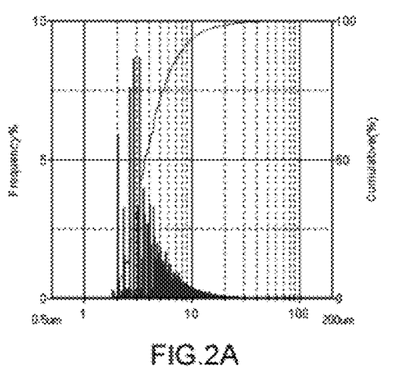
Figure 2B:
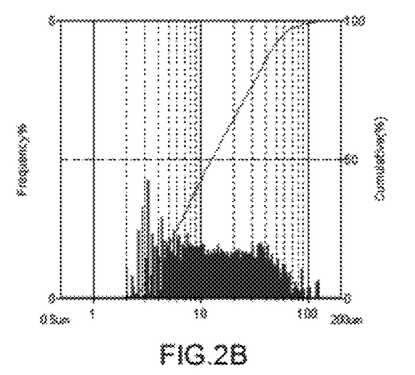
Figure 2C:
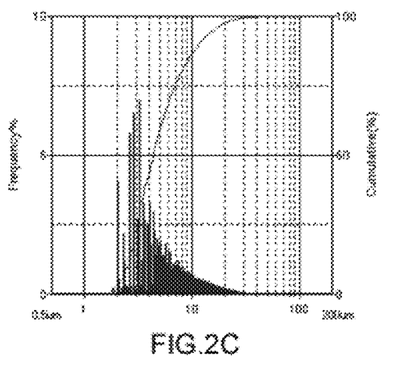
Figure 2D:
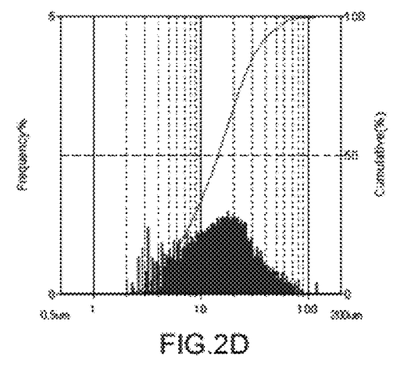
Figure 2E:
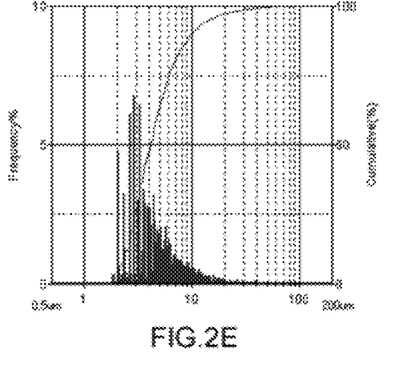
Figure 2F:
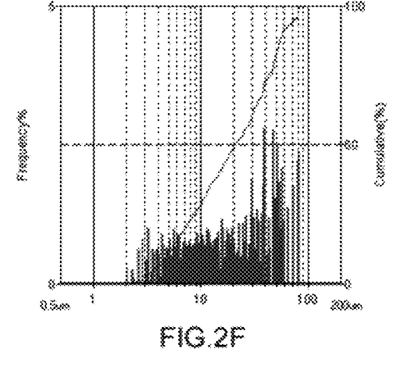
Figure 3A:
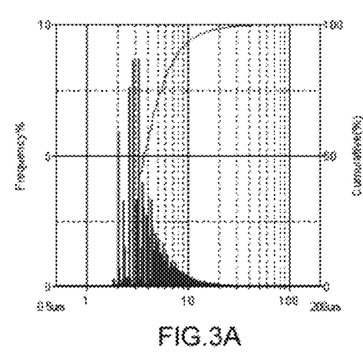
Figure 3B:
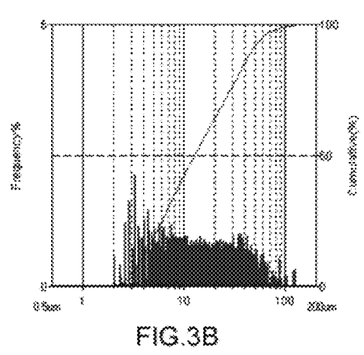
Figure 3C:
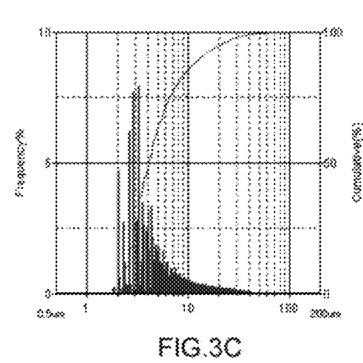
Figure 3D:
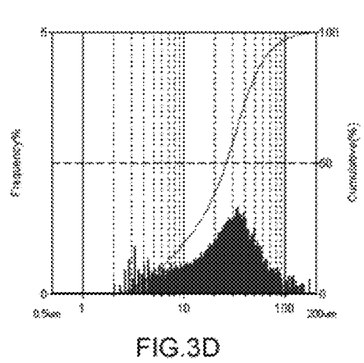

FIG. 1 presents a schematization of the flotation column implemented upon treating earths in laboratory with recovery of the froth concentrate by overflow. In accordance with the flotation principles, a collector is added and air bubbles are insufflated into the solution or suspension (earth in water) to be treated.

Physico-chemical characteristics of the suspensions, likely to affect flotation (size and surface charge) have been determined (Table 1 hereinafter).

TABLE 1

Samples for flotation study

|  | Samp. A | Samp. B | Samp. C |
| --- | --- | --- | --- |
| Solid contents (%) | 84.2 | 85.8 | 70.5 |
| Organic matter (incinerated at 425° C.) | 8.2 | 6.4 | 4.7 |
| 2 mm sieve pre-treatment | yes | yes | no |
| Suspended with Lhomargy | yes | yes | yes |
| 180 μm sieve pre-treatment particles >180 μm | 31 | 49.8 | 15.8 |
| pH (650 g/L suspension) | 7.7 | 7.8 | 7.2 |
| Zeta potential (mV) | −11.7 | −14.5 | −19.2 |
| Size (μm) (arith ave.) | 5 | 6.2 | 5.9 |
| Size (μm) (surf weigh. ave.) | 20.1 | 18.6 | 27.9 |

The samples selected for the study have a solid content varying between 70 and 84%, determined by incineration at 425° C. of about 6% and a pH, after suspending in water from the drinking water system, around 7.5.

They have very different characteristics in terms of particle size: sample C has the lowest rate of non-floatable coarse particles (>180 μm), followed by sample A and sample B.

For the so-called "floatable" fraction i.e particles <180 μm, average sizes (diameters) are given by way of illustration, since samples are very heterogeneous, the size distribution of each sample pre-sieved at 180 μm (measured with a FPIA apparatus such as Sysmex FPIA-3000) is shown in FIG. 2.

As regards zeta potential measurements performed in a liquid medium having a conductivity of 300 μS/cm, particles have a slightly negative surface charge: sample C is the most anionic, followed by sample B and then sample A.

I.2. Flotation Tests.

The selected samples, suspended with the chosen procedure, have characteristics which make them a priori floatable.

When considering the average sizes and surface charge, the use of a collector for flotation is recommended: tests are performed with a conventional deinking collector (calcium oleate) or with a specific cationic surfactant.

Flotations are performed using a Voith dispersed air cell, batchwise on a 22 L volume of a 20 g/L suspension at room temperature. The duration has been varied and will be set out in the results part.

Air is mechanically introduced through a turbine positioned at the bottom of the flotation cell, foams are removed by overflow.

Samples are collected before starting flotation (samp. EF=flotation inlet), at the end of treatment (samp. PF=floated «paste» i.e. having undergone a flotation treatment) and on foams (F).

The samples taken are characterised with the same measurements as those used to characterise the starting samples (solid contents, organic matter, particle sizes, zeta potential). The flotation yield is calculated from the amount of matter rejected with respect to the matter treated.

The flotation surface active additives used are selected from:
- sodium oleate having the formula $C_{17}H_{33}$—COONa, an anionic surfactant having a hydrophilic/hydrophobic balance (HLB) of 18;
- Brij S-100 having the formula $C_{18}H_{37}$—C(OCH$_2$CH$_2$)$_n$OH with n in the order of 100, a non-ionic surfactant having a HLB of 18;
- Glucopon® having the formula H—(C$_6$H$_{10}$O$_5$)$_n$—O—C$_x$H$_{2x+1}$ with 6≤x≤8 and 1<n<5, a non-ionic surfactant;
- tetradecyltrimethylammonium bromide (TTAB) having the formula $CH_3(CH_2)_{13}N(Br)(CH_3)_3$, a cationic surfactant.

I.3. Results.

The tests performed are listed in the following Table 2.

In the tests performed, sodium oleate is added at 1% (mass percent with respect to the 20 g/L earth particles suspension), Glucopon® 1 g of a 60% solution and 0.7% TTAB (mass percent with respect to the 20 g/L earth particles suspension).

The first test (Flotation Ref. 1) has shown that the selected foaming agent (Brij S-100) is not sufficient to form the foam to be removed by overflow. On the other hand, the addition of sodium oleate, which precipitates as calcium oleate with $Ca^{2+}$ ions of water, results in the formation of a foam stabilized by particles, which is quickly removed. Afterwards, the system goes back to its initial state.

With the aim of increasing the formed foam height, an effective foaming agent, Glucopon® (alkylpolyglucoside) is used: a foam of several centimeters high is then quickly formed and can be removed by overflow. However, this foam has a very high water fraction, with a quick enough drainage and seems poorly loaded in particles. A further test (Flotation Ref. 2), by reversing the adding order of the foaming agent (Glucopon®) and the collector (oleate) is also carried out, without substantial behaviour change.

The following tests are therefore performed by first introducing oleate and then Glucopon® and by sampling after the addition of each product. The first noticed effect is that the addition of oleate determines a particle agglomeration, as illustrated in FIG. 3. This tendency is also visible by analysing average values (Table 3 hereinafter).

TABLE 2

Flotations performed

| Samp. | Description | Pre-filtration | Ref |
|---|---|---|---|
| A | Brij with an increasing concentration, followed by adding oleate and adding Glucopon ® in the end | 150 μm | 1 |
| A | Glucopon ® 8 g/L followed by adding oleate (but after sampling) | Not filtered 180 μm | 2 |
| A | 1% Oleate (15 min) + air (1 sampling) + 1 g Glucopon ® (2 min) + air (flotation 4 min PF1) + 1 g Glucopon ® (flotation 5 min PF2) | | 3 |
| B | Glucopon ® (without oleate), 2 min and then flotation for 6 min | 180 μm | 4 |
| B | 1% Oleate (15 min) + air (1 sampling) + 1 g Glucopon ® (2 min) + air (flotation 4 min PF1 + 1 g Glucopon ® (flotation 5 min PF2) | 180 μm | 5 |
| B | 1% Oleate (15 min) + 1 g Glucopon ® + air (flotation 4 min PF1) (air immediately) + oleate Oleate + Glucopon ® after 15 min, flot. for 5 min and then sampling (foams) | 180 μm | 6 |
| B | | Non filtered | 7 |
| C | Oleate + Glucopon ® after 15 min, flot. for 5 min, oleate + Glucopon ® (same dose) and then sampling (foams) | 180 μm | 8 |
| C | 1% Oleate (15 min) + air (1 sampling) + 1 g Glucopon ® (2 min) + air (flot. 4 min) + 1% oleate (15 min) + air (1 sampling) + 1 g Glucopon ® (2 min) + air (flot. 4 min) | Non filtered | 9 |
| C | 0.7% TTAB | Non filtered | 10 |
| B | 0.7% TTAB | Non filtered | 11 |
| C* | 0.7% TTAB | Non filtered | 12 |
| A* | 0.7% TTAB | Non filtered | 13 |
| B* | 0.7% TTAB | Non filtered | 14 |
| A* | 0.7% TTAB and 114 g/L earth | Non filtered | 15 |

(*= Samples contaminated with CsCl)

TABLE 3

| Sample | Arith. mean diameter (μm) | Surf. weight. mean diameter (μm) |
|---|---|---|
| A EF | 5.03 | 20.46 |
| A EF + oleate 1% | 6.63 | 31.97 |
| A PF (oleate 1%) | 7.11 | 40.88 |

This collecting effect causes the 3.8% removal of particles, which are concentrated in the foams (100 g/L vs 14 g/L of the initial suspension). By analysing the foam composition, it would also seem that organic substances have been preferentially removed (organic matter: 17% vs 8% in the initial suspension).

Consequently, the system seems very reactive to the oleate introduction. However, the formed foam is quickly removed and then it is no longer possible to further remove matter, without introducing the foaming agent Glucopon®.

Upon adding Glucopon®, the same forms a fine enough foam, topped by a particle foam such as that formed in the presence of oleate. This effect thus causes the flotation of a further amount of matter, until the foam gradually becomes less and less loaded (changing from 30 g/L to 9 g/L, that is about the initial suspension concentration). This phenomenon is probably explained by the Glucopon® dispersing effect on particles, as highlighted by size measurements (Table 4 hereinafter).

TABLE 4

| Sample | Arith. mean diameter (μm) | Surf. weigh. mean diameter (μm) |
|---|---|---|
| Rosemary earth flot C PF before glu | 6.43 | 38.3 |
| Rosemary earth flot C PF after glu C2 | 4.39 | 7.89 |

The final yield, i.e. the amount of particles removed by flotation is 10.2%.

After the foam has been taken, whereas the system is no longer foaming, a second Glucopon® addition enables a fine foam to be obtained again, which is very wet, poorly loaded in particles, which are therefore not removed selectively but through hydraulic share.

The Glucopon® dispersing effect has also been checked by a test (Flotation Ref. 4) without oleate. In this case, the removal of particles is only explained by the hydraulic share (foam concentration in g/L=initial suspension concentration).

Consequently, it can be concluded that the oleate addition is necessary for the particle agglomeration and particle concentration in the foams which are stabilized by the same particles. It should be reminded that the very poorly soluble calcium oleate has no foaming property. Furthermore, as these stabilized foams are quickly exhausted, it could be advantageous to combine the oleate with a foaming surfactant.

The oleate and Glucopon® additions have been tested also with earth sample B (Flotation Ref. 5), the collector agglomeration and foaming effect have been observed again, but the efficiency of the treatment seems reduced with this type of earth (Table 5 hereinafter).

TABLE 5

Concentrations of suspensions before flotation (EF); after flotation treatment (PF) and of the foams (F1, 1° sampling after Glucopon® addition and F2, 2° sampling after the second Glucopon® addition)

| | Conc. (g/L) | | | | | | |
|---|---|---|---|---|---|---|---|
| Samp. | EF | PF | Moleate | F1 | F2 | Yield 1 | Yield 2 |
| A | 14.2 | 12.4 | 100.1 | 29.5 | 9.3 | 3.9 | 10.3 |
| B | 6.9 | 8.3 | — | 15.5 | 5.6 | 35.6 | 14.6 |

Indeed, the removal of particles is higher with earth sample B, but as can be observed by comparing the concentration of foams, this is mainly due to the hydraulic share and to higher water losses. Therefore, it seems that the nature of the treated soil significantly influences the flotation operation yield.

With earth sample B, a further test has been performed to check the effect of a second oleate addition, following the exhaustion of foams formed by the oleate followed by Glucopon® (Flotation Ref. 6). It has been observed that the second oleate addition enables a very concentrated foam of particles to be formed again, which is quickly removed. This seems to indicate that floatable matters remain in the suspensions. The oleate proportions which enable the entire particle foam to be quickly removed should then be optimized.

A flotation test with oleate+Glucopon®, without 180 μm filtration of the initial suspension (Flotation Ref. 7) resulted in similar results in terms of particle size, concentration of the accept and foams. The flotation of the non filtered sample has a lower yield, probably due to the presence of a much higher fraction of non-floatable coarse particles.

The same chemistry (oleate and Glucopon®) has been tested with the earth sample C, with the same concentrations (Flotation Ref. 8) or by adding increasing doses of products for the successive additions to the first one (Flotation Ref. 9). If the result of the first addition of products is compared to the same situation of the preceding tests, there can be noted that the earth sample C gives more concentrated foams (oleate+Glucopon®), yet with a yield similar to earth sample A (Table 6 hereinafter).

TABLE 6

Concentrations of suspensions before flotation (EF); after flotation treatment (PF) and of foams (F1, 1° sampling after Glucopon® addition)

| Samp. | EF | PF | Moleate | F1 | Yield 1 |
|---|---|---|---|---|---|
| A | 14.2 | 12.4 | 100.1 | 29.5 | 96.1 |
| B | 6.9 | 8.3 | — | 15.5 | 64.8 |
| C | 13.238 | 11.628 | 77.683 | 41.4379 | 98.57 |

By adding, in the same sample, the same amount of oleate and Glucopon®, it is possible to remove more particles (extraction yield of 17%).

Yet, an increasing addition of products (1° addition=dose x; 2° addition=dose 2x and 3° addition=dose 3x) enables further concentrated foams to be obtained and a 30% final removal of particles to be achieved.

These results suggest that the floatable fraction of earths (with the suspending specified in the method section) is very high and an optimization of chemistry is necessary for an effective treatment.

Further tests have been performed by changing the flotation chemistry and by using a cationic surfactant (TTAB) with the earth samples C (Flotation Ref. 10 and 11).

The dose to be added has been determined by identifying the concentration required to have a flocculation-coagulation, this has been made by zeta potential measurements, coupled to a visual observation.

Figure 4:
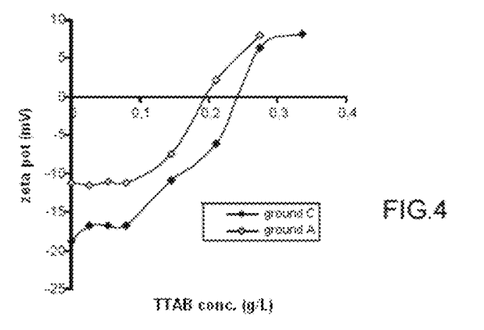
FIG. 4 presents the zeta potential of a suspension with 20 g/L earth from sample A or earth from sample C as a function of TTAB concentration.

Since particles of sample C seem more negatively charged than those of sample B, the neutralisation is observed for a lower TTAB concentration (FIG. 4). Furthermore, upon visual observation, a flocculation with a successive sedimentation is observed well before the neutralization of the surface charge. It is thus decided to set the TTAB concentration to about 0.1 g/L (that is 0.7 mass % based on the earth).

The first test with earth sample C results in a 83% removal of the particles present, whereas about 70% are removed with earth sample A (Table 7 hereinafter).

TABLE 7

Concentrations of suspensions before flotation (EF); after flotation treatment (PF) and of the foams F1.

| Samp. | Conc. (g/L) | | | Organic matter Incinerated at 425° C. | | | Yield 1 |
|---|---|---|---|---|---|---|---|
| | EF | PF | F1 | EF | PF | F1 | |
| C | 14.5 | 7.6 | 116.0 | 6.5 | 5.9 | 50.4 | 16.95 |
| A | 11.2 | 7.2 | 164.4 | 5.3 | 4.7 | 36.1 | 31.63 |

The zeta potential measurements seem to indicate that non-floated particles are those that did not interact with the cationic surfactant, whereas in the foams, those with a surface charge that has been neutralized by TTAB are seen again (Table 8 hereinafter).

TABLE 8

Zeta potential values.

| Samp. | Zeta Pot. (mV) | | |
|---|---|---|---|
| | EF | PF | F1 |
| C | −18.5 | −12.3 | −0.7 |
| A | −15.4 | −15.4 | −6.6 |

The behaviour difference between both earths could be explained by considering that, for earth sample C, the surfactant effect is clearly visible on sizes too, whereas, for earth sample A, even though less charged, the agglomeration effect is very poorly visible (although it can be seen by comparing the distribution graphs).

Table 9 hereinafter summarizes the arithmetic mean diameter of the particle sizes as a function of the earth sample and as a function of the undergone treatment.

TABLE 9

Particle size values.

| Samp. | Arith mean diameter (μm) | | | |
|---|---|---|---|---|
| | initial | EF | PF | F1 |
| C | 5.7 | 32.67 | 7.14 | 21.67 |
| A | 5 | 4.74 | 4.85 | 6.08 |

I.4. Results on Contaminated Earths.

The same chemistry has been used with the three earth samples A, B and C (flotations Ref. 12, 13 and 14), contaminated with cesium chloride.

The results are summarized in Table 10 hereinafter. Once again, the nature of the earth has a key role in the particle removal rate (between 4 and 67%). Cesium extraction yields from 70% (Sample A) to 99% (Sample C) have been measured.

TABLE 10

Flotation of contaminated earths.

| Sampl. | Conc. (g/L) | | | Yield 1 |
|---|---|---|---|---|
| | EF | PF | F1 | |
| C | 21.71 | 1.399 | 95.97 | 66.49 |
| A | 25.685 | 3.638 | 131.17 | 44.8 |
| B | 21.47 | 3.76 | 114.69 | 4.15 |

I.5. Conclusion.

The given examples allowed us to confirm the possible removal of a variable fraction of the colloid present in a contaminated earth. The yield of this operation depends on the sample pre-treatment but above all on the chemistry used for the flotation: the use of a fatty acid soap ($Ca^{2+}$ oleate) type collector or a cationic surfactant (TTAB) resulted in particle removals ranging from 4 to 80%.

On the other hand, the flotation allows the selective removal of the organic colloid matter and consequently the cesium-humic acid complexes.

The tests performed also show the importance of the nature of the soil on the final flotation yield, by indicating the need to study thoroughly the physico-chemical characterizations of the earth to be treated.

The flotation has a large available potential as a continuous treatment, having a great capacity (several hundred m³/hour) and performed with possibly movable facilities. The development of a suitable chemical formulation (collector alone or collector+foaming) remains a key factor, and can be optimized for each soil, depending on its characteristics and the cesium distribution.

II. Process According to the Invention on a Continuous Pilot Scale.

II.1. Backearth and Objectives.

Following the positive results regarding the floatability of earth samples with the aim of decontaminating polluted soils, the feasibility on the pilot scale with a continuous process has been tested. It has also been decided to test, during tests on the pilot facility, the impact of the collector and the parameters of the flotation process (gas flow rate, foam height) on the treatment yield.

II.2. Matter and Methods.

A. Characterization of the Raw Matter.

The earth for tests has been purchased from a horticulturist from Grenoble region, in order to have a composition similar to that of one of the samples studied beforehand in laboratory (Sample C).

The earth has been suspended, according to the method of Example I, namely gentle mechanical stirring, with a 40 g/L concentration. The physico-chemical characteristics of the suspension (size and surface charge), likely to affect flotation, have been determined by image analysis (Sysmex FPIA-3000 Malvern) and flow potential measurement (SPZ, Mutek) respectively.

B. Laboratory Flotation.

Laboratory pre-tests have been performed for comparison with the study of Example I and selecting suitable proportions of collectors. The method followed for preparing samples, characterizing them and for the flotation, was the method set during a preceding study, namely: preparation of the suspension with a Lhomargy apparatus (3000 rpm for 5 min, at 146 g/L), 2 mm and 180 µm sieving; flotation with a Voith dispersed air cell, batchwise on a 22 L volume of 20 g/L suspension at room temperature.

C. Pilot.

Suspending:

Helico slurrier, mixer with a stainless steel one piece rotor, which ensures a matter circulation at the greatest consistency possible. The suspending has been performed at about 570 $g_{dry}$/L during the validation test, then it has been possible to rise to nearly 2.2 $kg_{dry}$/L, during the following test (mass concentration in the order of 70%).

Pre-Screening (HeliPoire):

After the slurrier, a first step of removing the coarsest contaminants is performed, thanks to a draining ball type coarse screening apparatus, which includes a separating grid (6 mm holes), in front of which is located a rotor the purpose of which is to prevent contaminants from obstructing the grid.

HD Hydrocyclone:

In order to remove particles having density and size higher than those which could be floated, the suspension is brought into an hydrocyclone, which separates both phases under the effect of a vortex flow generating a centrifugal acceleration.

Screen:

After the hydrocyclone, the suspension passes through a vessel which feeds a fine scrubbing step, to separate particles having a greater size than slots of a cylindrical basket, which together with the rotor, makes up the screen. The objective of the rotor is to prevent the forming of a coat which would cover the slots. This is achieved using blades rotating in the vicinity of the sieve surface. For the test, a sieve having slots of 350 µm has been selected.

Flotation:

the suspension then feeds 2 flotation cells in series, with an air injection by Venturi (external recirculation of the paste), 2 injectors per cell, positioned at 2 heights. The suction of the foam is made by setting the height of suction units connected to a "foam breaking" pan, in vacuum pressure. Feed flow rate: 1.4 m³/h, 40 $g_{dry}$/L suspension. The other parameters, variable over the course of the test (air contents and height of the foams) will be specified in the result section.

Samples are collected at the inlet of flotation (samp. EF=flotation input), at the output (samp. FP=floated "paste", i.e. having undergone the flotation treatment) and on foams (F).

The samples taken are characterised with the same measurements as those use to characterise the starting samples (solid contents, organic matter, particle size, zeta potential).

The flotation additives used are sodium oleate and TTAB.

II.3. Results.

A. Characterization of Raw Matter.

The characteristics of the suspension are summarized in Table 11 hereinafter.

TABLE 11

Samples for the pilot flotation study and for comparison with sample C of example 1 (*: 22, 2 µS/cm and **: 300 µS/cm).

|  | Pilot Samp. (Surface layer) | Samp. C |
| --- | --- | --- |
| Solid contents (%) | 83.68 | 70.5 |
| Organic matter (incinerated at 425° C.) | 9.13% | 4.7% |

TABLE 11-continued

Samples for the pilot flotation study and for comparison with sample C of example 1 (*: 22, 2 µS/cm and **: 300 µS/cm).

|  | Pilot Samp. (Surface layer) | Samp. C |
| --- | --- | --- |
| 1,2 mm sieving pre-treatment | 9.35% | no |
| Suspending with Lhomargy | 350 g/L | 350 g/L |
| 180 µm sieving pre-treatment particles >180 µm | 21.10% | 15.8% |
| pH (650 g/L suspension) | 8.45 | 7.2 |
| Zeta potential (mV)* | −2.4 |  |
| Zeta potential (mV)** | −18.3 | −19.2 |
| Size (µm) (arith. ave.) | 6.476 | 5.9 |
| Size (µm) (surf. weig. mean) | 20.477 | 27.9 |

The earth received for tests on the pilot facilities has characteristics very close to that previously floated in the laboratory, except for the organic matter content, which is higher (compatible with the agricultural exploitation of this earth).

The pH after suspending in water from a drinking water system is around 8.

For the floatable fraction, the average size (diameter) is given by way of illustration, samples being very heterogeneous, as checked by measurement of the size distribution of each sample pre-sieved at 180 µm with the FPIA apparatus.

The studied sample has characteristics which make it floatable, according to the gained knowledge and according to the preliminary study in the laboratory.

Considering the results from example I, average particle sizes of the earth and the surface charge thereof, tests are performed with a conventional deinking collector (calcium oleate) and with a cationic surfactant.

In order to identify the necessary surfactant concentration to have a flocculation-coagulation, zeta potential measurements, coupled with a visual observation, have been performed. Indeed, during the preceding study, the visual observation had highlighted a flocculation with a successive sedimentation, well before the neutralization of the surface charge. It is thus required, in order to avoid a non-selective collection and a reduction in the flotation efficiency, to determine the surfactant concentration for which the particles-surfactant interaction occurs, however without yielding a too elevated flocculation.

For that reason, the zeta potential of a 40 g/L suspension has been measured as a function of the TTAB/substrate mass ratio. As the curve obtained is similar to that obtained for Sample C, it has been decided not to exceed a 0.01 g/g surfactant proportion that is about 0.3 g/L ($8.9 \cdot 10^{-4}$ M). The c.m.c. value found in Literature is $3.5 \cdot 10^{-3}$ M.

B. Laboratory Flotation.

The behaviour of the system is nearly identical to that observed during the preceding study with sample C. The addition of the collector results in the formation of aggregates which enable foams to be stabilized. The latter are very stable and very concentrated. The removal rates are also similar: the oleate yields a 5.6% rate vs 4% during the preceding tests, the TTAB results in a 62.5% removal vs 83% in the preceding tests (but performed in the presence of a slightly higher surfactant/earth ratio).

It is thus possible to modulate the particle removal rate according to the type and the concentration of the collector used (between 5 and 60% for these tests) as well as the duration of the process.

C. Pilot.

The first day of test enabled the technical feasibility of earth flotation to be validated with current pilot facilities. A sieving on a 250×250 μm sieve has been selected for this first test, as a substitution for the passage through the slot screen, in order to limit the raw matter losses and too high a dilution.

On the same occasion, the oleate (NaOl) effect has also been tested.

Depending on indications obtained during this first day, it has been decided for the second series, (i) to increase the suspending concentration, (ii) to use the 350 μm slot screening; (iii) to set the suction units to the maximum height during flotation.

During the second operating day (14$^{th}$ March), the cationic surfactant TTAB has been tested.

The striking elements of both tests are listed in Table 12 hereinafter.

TABLE 12

Amounts treated and scrubbing yield, day 1 (NaOl) and 2 (TTAB).

|  | Pre-test (NaOl) | Test (TTAB) |
| --- | --- | --- |
| Solid contents (kg) | 50 | 159 |
| Organic matter (incinerated at 425° C.) | 11% | 10% |
| Suspending Helico concentration | 559 g/L | 2239 g/L |
| 6 mm Pre-filtration Removal | 2.4% | 1.2% |
| Hydrocyclone Removal | 8.8% | 8.1% |
| 350 μm Slot screening Removal | 4.9% | 9.2% |
| Removal before flotation | 16.1% | 18.5% |

It can be seen that the scrubbing steps prior to flotation result in a similar removal rate (although slightly lower) than that determined in the laboratory with a 180 μm sieving (that is 21%, cf Table 11).

For the flotation, the air rate has been set to 350%, whereas the height of the suction units has been adjusted according to the total foam thickness. The sodium oleate (added in the flotation feeding vessel) precipitates as calcium oleate with $Ca^{2+}$ ions of water, collects particles, which then stabilize the foam.

The surface charge of the particles is not significantly affected by the presence of oleate, the value of particles before and after addition of oleate, as well as before and after flotation is identical to that measured during the characterization of raw matters (−18 mV). However, it would seem that the more anionic particles have been more selectively collected, because measurements made on foams yield slightly higher zeta potential values (~23 mV). This is compatible with particles/calcium oleate agglomerates because the oleate is more negatively charged.

The particle agglomeration induced by oleate, which had been highlighted during laboratory tests (example I), is less visible in the pilot test: the average particle size in foams does not significantly differ from that of particles at the inlet or outlet. The analysis of the size distribution however shows a slight agglomeration effect.

Given that, during the test with oleate, the (inlet, outlet and foams) flows have been recirculated and part of the foams has been discharged, it is possible to think of a quick oleate dilution, continuous tests could confirm this hypothesis.

As regards the flotation operation yield, the removal rate ranges from 6 to 20%. This test has highlighted the need for a system which enables the foam aging. Indeed, by switching off suction and by manually taking foams which could have braked, it has been possible to measure a high concentration, that is 118 g/L for the foam of the first cell and 88 g/L for that of the second one.

To confirm this conclusion, part of the feed (~200 L) has been taken and used for a flotation on the cell of the flotation column continuously. Besides the cell design, this is distinguished by the suction system, throughout the column cross-section and with an adjustable height. This difference enabled 83 g/L foams to be obtained.

Another interesting conclusion of the test is that foams are enriched in organic matter, which is consistent with a selective removal of clay-humus complexes. This observation had already been made during the previous laboratory study (example I) and had led to the conclusion that the flotation could enable the selective removal of the organic colloidal matter and consequently the possible humic acid-Cs complexes.

D. Flotation with TTAB.

This cationic surfactant has been added with a metering pump before one of the flotation feeding pumps, which determines a surfactant/earth contact time of several seconds.

Shear in pumps and the heavy turbulence area during the air injection ensure mixing and adsorption of the surfactant on the earth particles. The initial system (maximum height of the suction units; air rate 350%; concentration 0.1 g/L) caused a too high foaming. To overcome this drawback, the air rate has been reduced, and the surfactant concentration as well.

The foam formed in the presence of TTAB is very different from that formed in the presence of oleate: it seems to be comprised of very fine bubbles, with a high water content and an extremely slow liquid drainage. It would seem that, in this case, the stabilization by particles is added to the surfactant stabilizing effect, by strongly enhancing the tendency thereof to slow down the foam drainage and to increase the water content thereof.

In the concentration range tested (0.1 and 0.05 g/L), the surfactant interacts with particles, by slightly decreasing their surface charge, however without achieving neutralization which would result in a null selectivity of the process.

By decreasing the surfactant concentration, no effect is visible on the zeta potential value of the inlet (however, it should be reminded that the zeta potential is a global parameter which averages the charge state of each particle), but it can be observed that collected particles tend to be more negatively charged, namely the zeta potential value is closer to their initial charge (~18 mV).

In spite of these low variations in the absolute zeta potential value, the effect on agglomeration is strong, as can be deduced from size measurements. Indeed, it is observed that the addition of the surfactant induces particle agglomeration, because the average (surface weighted) diameter changes from 15-20 μm (before TTAB) to 50-60 μm (after TTAB). The decrease in surfactant concentration induces a reduction in size (35-40 μm). In any case, the particles which have floated and which are found in foams have a lower size.

The results obtained, in terms of removal, are summarized in Table 13 hereinafter.

TABLE 13

Result of the flotation with TTAB, Removal = FM/(OM + FM) with FM = Foam Mass and OM = Output Mass

|  | Air rate | [TTAB] (g/L) | Removal (%) |
|---|---|---|---|
| Test 0 | 350 | 0.1 | Too much foam/overflow |
| Test 1 | 250 | 0.1 | 21.0 |
| Test 2 | 100 | 0.1 | 8.5 |
| Test 3 | 100 | 0.05 | 2.7 |

By varying again the air rate and the collector concentration, it is possible to vary the removal rate, down to 2%.

As already observed with the oleate, the flotation seems to selectively remove the organic colloidal matter since an enrichment in organic matters of the foam is obtained.

II.4. Conclusions.

This study enabled the continuous earth flotation to be validated on the pilot scale, on an earth amount of about 250 kg.

It has been possible to use existing equipment for scrubbing and flotation, without major modification and with results very close to those previously obtained in the laboratory.

It has been confirmed that this treatment enables a variable fraction of colloid present in an earth to be removed, and mainly the organic colloidal matter.

The yield of this operation can be adjusted by varying (i) the type and the concentration of the collector, (ii) parameters of the process (air rate, suction unit height . . . ).

During the tests performed, the removal rate ranged from 2 to 20%.

The test has also highlighted the need for a system suitable for controlling the ageing of foams which, with other considerations, suggests that the most suitable design for an earth flotation cell would be a cell column with suction throughout the cross-section and with a variable foam thickness.

REFERENCES

[1] Guide methodologique de gestion des sites potentiellement pollues par des substances radioactives IRSN, 2010
[2] Poinssot C, Baeyens B and Bradbury M H (1999). Experimental and modelling studies of caesium sorption on illite. Geochim Cosmochim Ac, 63(19-20): 3217-3227
[3] Rigol A, Vidal M and Rauret G (2002). An overview of the effect of organic matter on soil radiocaesium interaction: implications in root uptake. J Environ Radioactiv, 58(2-3): 191-216
[4] Patent application JP 2002 248459 in the name of Dowa Mining Co Ltd, published on Sep. 3, 2002.
[5] U.S. Pat. No. 5,303,871 in the name of Biotrol Inc., published on Apr. 19, 1994.

The invention claimed is:

1. A process for treating contaminated earth including at least one radionuclide, the process comprising:
at least one step of separating said at least one radionuclide by dispersed air flotation foam, the dispersed air flotation foam being produced by blowing air bubbles in a suspension including said contaminated earth and at least one collector,
wherein the at least one radionuclide is at least one of (i) trapped in interfoliar spaces of wet clay particles, (ii) complexed in humic substances and (iii) inside hybrid clay-humic complexes.

2. The process according to claim 1, wherein said at least one radionuclide is selected from the group consisting of tritium $^3$H; carbon $^{14}$C; strontium $^{90}$Sr; yttrium $^{90}$Y; cesium $^{137}$Cs; barium $^{137m}$Ba; americium $^{241}$Am; a radionuclide from the thorium 232 family; and a radionuclide from the uranium 238 family.

3. The process according to claim 1, wherein said at least one radionuclide is cesium $^{137}$Cs.

4. The process according to claim 1, wherein said process is implemented in a flotation column or a flotation cell.

5. The process according to claim 1, further comprising the steps of:
a) injecting the air bubbles into the suspension including said contaminated earth and said at least one collector, to produce the dispersed air flotation foam; and
b) separating at least one part of said dispersed air flotation foam from the rest of the suspension.

6. The process according to claim 5, wherein said suspension comprises:
2-40% by weight of the contaminated earth to be treated based on a total weight of the suspension;
0.005-5% by weight of the at least one collector based on the total weight of the suspension; and
water.

7. The process according to claim 5, wherein said at least one collector is selected from a fatty acid, a fatty acid salt, and a cationic surfactant.

8. The process according to claim 5, wherein said at least one collector is sodium oleate.

9. The process according claim 5, wherein said at least one collector is tetradecyltrimethylammonium bromide (TTAB).

10. The process according to claim 5, wherein said suspension comprises, in addition to said at least one collector, at least one foaming surfactant.

11. The process according to claim 10, wherein said at least one foaming surfactant is selected from polyalkylglycosides, sulfobetaines, ethoxylated alcohols, and amine oxides.

12. The process according claim 1, further comprising:
subjecting said earth contaminated by the at least one radionuclide to a treatment step to remove mineral or organic components having a diameter higher than 300 μm, prior to the at least one step of separating.

13. The process according to claim 5, wherein
the process is implemented in a flotation column or a flotation cell having a height between 1 m and 8 m, and a height of the dispersed air flotation foam produced in step (a) is between 30 cm and 600 cm.

14. The process according to claim 13, wherein, in step (b), the separating at least one part of said dispersed air flotation foam comprises separating radionuclide-enriched foam at a top of the flotation column or the flotation cell from the rest of the suspension by suction or overflow.

15. The process according to claim 5, wherein said suspension comprises 10-30% by weight of the contaminated earth to be treated based on the total weight of the suspension.

16. The process according to claim 5, wherein said suspension comprises 0.01-2% by weight of the at least one collector based on the total weight of the suspension.

17. The process according to claim 5, wherein
the process is implemented in a flotation column or a flotation cell having a height between 1 m and 8 m, and a height of the dispersed air flotation foam produced in step (a) is between 80 cm and 400 cm.

18. The process according to claim 1, wherein said earth contaminated by the at least one radionuclide is excavated or pumped.

19. A flotation foam obtained from an earth suspension by implementing the process according to claim 1, the flotation foam, comprising:
- 2-40% by weight of the contaminated earth to be treated based on a total weight of the suspension;
- 0.005-5% by weight of the at least one collector based on the total weight of the suspension, the at least one collector being selected from a fatty acid, a fatty acid salt and a cationic surfactant; and
- water.

20. The flotation foam according to claim 19, wherein said suspension comprises at least one foaming surfactant, in addition to the at least one collector.

21. The flotation foam according to claim 19, wherein said suspension comprises 10-30% by weight of earth to be treated based on the total weight of the suspension.

22. The flotation foam according to claim 19, wherein said suspension comprises 0.01-2% by weight of the at least one collector based on the total weight of the suspension.

\* \* \* \* \*